United States Patent

Thies et al.

[15] 3,673,287

[45] June 27, 1972

[54] METHOD OF MAKING CAST-IN-PLACE END-BURNING PROPELLANT GRAINS

[72] Inventors: Charles E. Thies, Huntsville; Bernard L. Thompson, Toney; Stanley E. Anderson, Huntsville, all of Ala.

[73] Assignee: The United States of America as represented by the Secretary of the Army

[22] Filed: Dec. 23, 1968

[21] Appl. No.: 786,488

[52] U.S. Cl. ..................................264/3, 102/103, 149/7, 149/11, 149/14
[51] Int. Cl. ..........................................C06b 21/02
[58] Field of Search ......................264/3; 86/20, 1; 102/103; 149/14, 7, 11

[56] References Cited

UNITED STATES PATENTS

| | | | |
|---|---|---|---|
| 3,054,258 | 9/1962 | Marti | 102/103 X |
| 3,056,171 | 10/1962 | Fite | 264/3 |
| 3,118,380 | 1/1964 | Damon et al. | 102/103 |
| 3,144,830 | 8/1964 | Fries et al. | 102/103 |
| 3,157,127 | 11/1964 | Proell | 102/103 |
| 3,188,962 | 6/1965 | Mosher | 264/3 X |
| 3,252,369 | 5/1966 | Bartley et al. | 264/3 X |
| 3,421,325 | 1/1969 | Thibodaux | 264/3 X |

*Primary Examiner*—Carl D. Quarforth
*Assistant Examiner*—Stephen J. Lechert, Jr.
*Attorney*—Harry M. Saragovitz, Edward J. Kelly, Herbert Berl and James T. Deaton

[57] ABSTRACT

An improved method of making cast-in-place end-burning propellant grains for rocket motors comprising the steps of applying a release agent to the rocket motor case insulation or rocket motor case, applying a liner/restrictor material over the release agent, casting the propellant directly inside the restrictor, curing the propellant and restrictor material to thereby bond the propellant directly to the restrictor whereby an end-burning propellant grain is formed in the restrictor adjacent the release agent which is adjacent the rocket motor case insulation or the rocket motor case of he rocket motor containing the cast-in-place end-burning propellant grain.

9 Claims, 2 Drawing Figures

CHARLES E. THIES
BERNARD L. THOMPSON
STANLEY E. ANDERSON,
INVENTORS.

METHOD OF MAKING CAST-IN-PLACE END-BURNING PROPELLANT GRAINS

BACKGROUND OF THE INVENTION

This invention relates to a cast-in-place method of making end-burning grains for rocket motors.

In the past, end-burning grains for rocket motors have been successfully made by cartridge-loading the grains in the rocket motor case. However, cartridge-loaded grains require excessive amounts of hand labor, inspection, and machining or "trimming" to close tolerances. Accordingly, a new method for making cast-in-place end-burning grains for rocket motors has long been sought after. Casting the propellant directly in a rocket motor case is a desirable cast-in-place method provided the propellant grains made thereby are equivalent to or better than cartridge-loaded grains. A cast-in-place method will result in a considerable saving in time and costs. However, the performance and/or reliability of motors made by a cast-in-place method must be equivalent to or better than motors made by cartridge-loading if such a method is successful for making end-burning propellant grains.

In the past, attempts to make end-burning propellant grains by direct casting have resulted in many failures. The failures have been due mainly to contractions during the curing period. The contractions oftentimes result in a pulling away of the propellant from the motor case or motor case insulation. The pulling away or the cracking of the propellant grains that oftentimes resulted during the curing period may be a direct cause of uneven burning of the propellant grain of the rocket motor. Uneven burning results in an uncontrolled rocket motor and failure thereof.

Casting of propellant is generally accomplished by pouring the propellant mix in the rocket chamber while the propellant is at an elevated temperature. The propellant is allowed to solidify to form a propellant grain. The time between the propellant casting and the point when propellant reaches the proper solid state is the curing period. When the propellant is cured the rocket motor is ready for use after the necessary igniter, nozzle, and the like are installed, if no grain shrinkage cracks are present.

Many times, prior to use, a rocket motor may be exposed to many temperature extremes, and as a result of these extremes, the propellant grain may develop cracks or may pull away from the sides of the motor case or motor case insulation. When the propellant grain is ignited it will burn at all exposed surfaces. The cracks yield undesired exposed surfaces which surfaces can be a site for burning. The burning can proceed down the propellant cracks or down the additional propellant surfaces exposed next to the insulation or motor case surface (cracks or undesired exposed surfaces caused by the pulling away of the propellant during expansions or contraction periods). These phenomena result in uncontrolled burnings. A controllable end-burning propellant grain must burn across the face of the desired layer, e.g., for example, as a cigarette burns at the end and progressively down the length. An end-burning propellant grain which does not burn evenly and across the face results in an uncontrollable rocket motor. Failure of the rocket motor can result when uncontrolled burning causes excessive increases in the rocket motor chamber pressure.

Accordingly, the principal object of this invention is to provide an improved method for making cast-in-place end-burning grains which are substantially crack-free after curing in the rocket motor case.

Another object of this invention is to provide a method which produces end-burning grains in situ which are equivalent to or better than cartridge-loaded grains.

A particular object of this invention is to provide an improved method of producing end-burning grains for rocket motors by casting directly into a restrictor contained in a rocket motor case.

SUMMARY OF THE INVENTION

This invention employs an improved method for making end-burning grains for rocket motors by casting propellant in a restrictor in a rocket motor case. This method involves applying a release agent to the rocket motor case insulation or to the motor case, if no insulation is used, applying a liner/restrictor material over the release agent, and casting the propellant directly inside the restrictor where the propellant is cured and bonded to the restrictor.

BRIEF DESCRIPTION OF THE DRAWING

These and other objects and attendant advantages of the method of this invention will become more readily apparent by reference to the following detailed description. When considered in conjunction with the accompanying drawing, which form as integral part thereof.

In the drawing.

DESCRIPTION OF THE PREFERRED EMBODIMENTS

Figure 1:
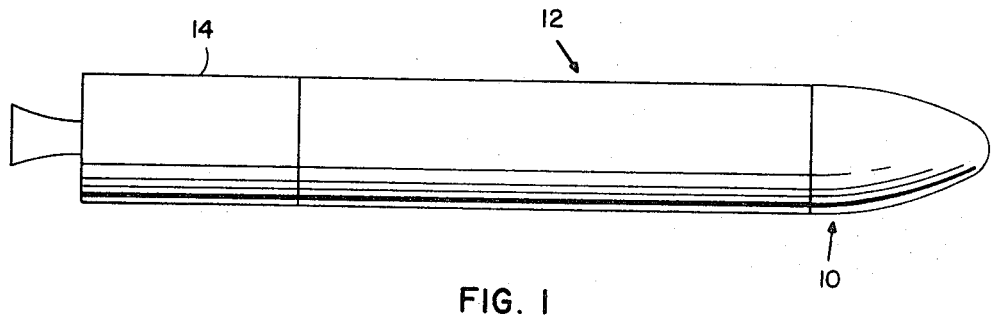
FIG. 1 is a view of the rocket containing a rocket motor case.
Figure 2:
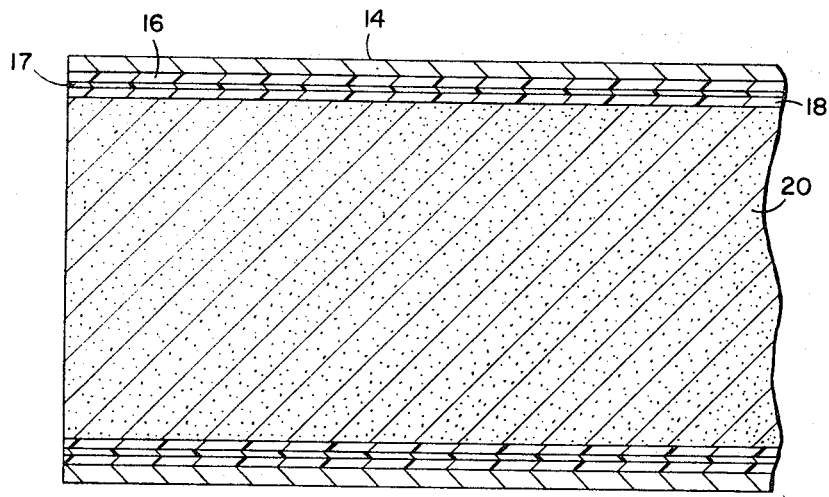
FIG. 2 is a cross-sectioned view of a portion of a rocket grain cast in accordance with the method of this invention.

Referring now to FIG. 1, a rocket 10 is shown having a shell 12 and a rocket motor case 14 at the rear thereof. A portion of rocket motor case 14 is shown in FIG. 2, having a layer 16 of rocket motor case insulation on the interior thereof. A layer 17 of a release agent is present on the interior of layer 16, while a layer 18 of a liner/restrictor material (restrictor) is present on the interior of layer 17. Inside layer 18 is an end-burning rocket grain 20.

The method of this invention involves coating a release agent on the case or case insulation, applying a liner/restrictor material over the release agent, and casting the propellant inside the restrictor to bond the propellant directly to the restrictor. The propellant grain is not bonded to the case or case insulation; therefore, cracks cannot occur since thermal stresses (due to temperature changes) are not induced between the case (or case insulation) and the propellant grain.

The method of applying the release agents are well known in the art. The general function of a 20. agent is to prevent the cast propellant from sticking to the material to which applied, e.g., motor case, motor case insulation, or mandrel when required in certain grain configurations. The release agents used in this invention prevent the restrictor from sticking to the motor case or motor case insulation. Examples of suitable release agents are various halogen-containing polymers such as polytetrafluoroethylene, commonly sold under the tradename, Teflon, and silicone resinous compounds such as one sold under the Dow Corning tradename DC–20. DC–20 is a liquid releasing agent containing silicone resins. In general, the releasing agent should be insoluble in the plastic, resinous, or propellant formulation which is being molded, should not melt at the curing temperature employed, and should be applied in a very thin continuous layer. The DC–20 can be applied over the more permanent release agent made from Teflon to provide additional release function, if desired.

The restrictor is made by applying to the release agent coated on the case or case insulation a layer (approximately one-eighth inch) of any of the slow burning materials used for this purpose in the art. The restrictor materials such as: cellulose acetate, ethylcellulose, butadiene-methylvinylpyridine copolymer, GR-S rubber, natural rubber, and the like are satisfactory for use in this invention. GR-S is an abbreviation for government rubber-styrene, produced by emulsion polymerization of 75 parts butadiene and 25 parts styrene, and also referred to as Buna-S. SBR is another acceptable designation for the referred to styrene-butadiene type rubber.

The restrictor, as defined for use in this invention, is bonded to the propellant grain during the propellant curing cycle. The propellant grain with the restrictor bonded thereto is adjacent the release agent. The release agent, adjacent the motor case or the motor case insulation, performs the function of preventing the sticking of the restrictor material to the rocket motor case or rocket motor case insulation. The propellant mix is cast into the space defined by the restrictor wherein it is cured by conventional procedures known in the art for the type of propellant used.

Test motors using various types of propellants were made in accordance with the method of this invention. The propellant grains were found to be substantially crack-free. The cast-in-place grains were fired at temperatures from −35° F. to +135° F. All motors burned evenly, and the test firings were considered successful.

A motor based on a tactical design was produced in accordance with the method of this invention using advanced high-energy propellants and was also test-fired successfully at temperature extremes.

The successful testing of the rocket motors made in accordance with the disclosed invention indicate that the propellant grains of this invention are suitable for replacing cartridge-loaded grains. The motor firings indicate that the reliabilities and performances of grains made in accordance with this invention are equivalent to or better than cartridge-loaded grains tested and fired under similar conditions. The grains made in accordance with this invention resulted in a substantial savings in time for manufacture as compared with a comparable sized grain of the cartridge-loaded type. Because of the results achieved, the improved method of this invention offers several advantages, in addition to the ones discussed herein, over the method for the cartridge-loaded grains.

The techniques involved in the method of this invention are such that high production rates are easily obtainable.

We claim:

1. The method of making end-burning grains for rocket motors comprising the steps of applying a release agent to the interior of a rocket motor case, applying a restrictor material over said release agent, and casting a propellant grain directly inside the space defined by said restrictor material, curing the propellant grain and restrictor material to thereby bond said propellant grain directly to said restrictor material.

2. The method of claim 1 and wherein said rocket motor case has insulation at the inside surface thereof and said release agent is applied to said insulation.

3. The method of claim 1 and wherein said release agent is selected from the release agents, consisting of polytetrafluoroethylene and silicone resins.

4. The method of claim 1 and wherein said restrictor material is selected from the restrictor materials consisting of cellulose acetate, ethylcellulose, butadiene-methylvinylpyridine copolymer, and styrene-butadiene rubber constituted of an emulsion polymerization product containing about 75 weight parts of butadiene and about 25 weight parts of styrene and wherein said restrictor material is applied in sufficient thickness to permit curing and bonding of the propellant directly to the restrictor material to thereby yield a substantially crack-free propellant grain.

5. The method of claim 1 and wherein said release agent is selected from the release agents consisting of polytetrafluoroethylene and silicone resins and wherein said restrictor material is selected from the restrictor materials consisting of cellulose acetate, ethylcellulose, butadiene-methylvinylpyridine copolymer, and styrene-butadiene rubber constituted of an emulsion polymerization product containing about 75 weight parts of butadiene and about 25 weight parts of styrene and wherein said restrictor material is applied in sufficient thickness to permit curing and bonding of the propellant directly to said restrictor material to thereby yield a substantially crack-free propellant grain.

6. The method of claim 4 and wherein said restrictor material is applied in a thickness of approximately one-eighth inch.

7. The method of claim 5 and wherein said restrictor material is applied in a thickness of approximately one-eighth inch.

8. The method of claim 2 and wherein said release agent is selected from the release agents consisting of polytetrafluoroethylene and silicone resins and wherein said restrictor material is selected from the restrictor materials consisting of cellulose acetate, ethylcellulose, butadiene-methylvinylpyridine copolymer, and styrene-butadiene rubber constituted of an emulsion polymerization product containing about 75 weight parts of butadiene and about 25 weight parts of styrene and wherein said restrictor material is applied in sufficient thickness to permit curing and bonding of the propellant directly to said restrictor material to thereby yield a substantially crack-free propellant grain.

9. The method of claim 8 and wherein said restrictor material is applied in a thickness of approximately one-eighth inch.

* * * * *